E. W. DAVIS.
TURNTABLE SUPPORT FOR CAMERAS.
APPLICATION FILED MAY 24, 1919.
1,378,999.
Patented May 24, 1921.
2 SHEETS—SHEET 1.
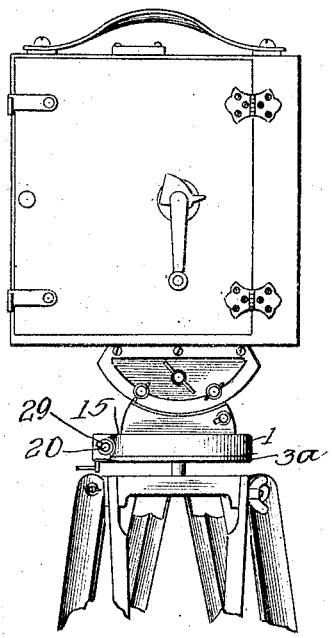
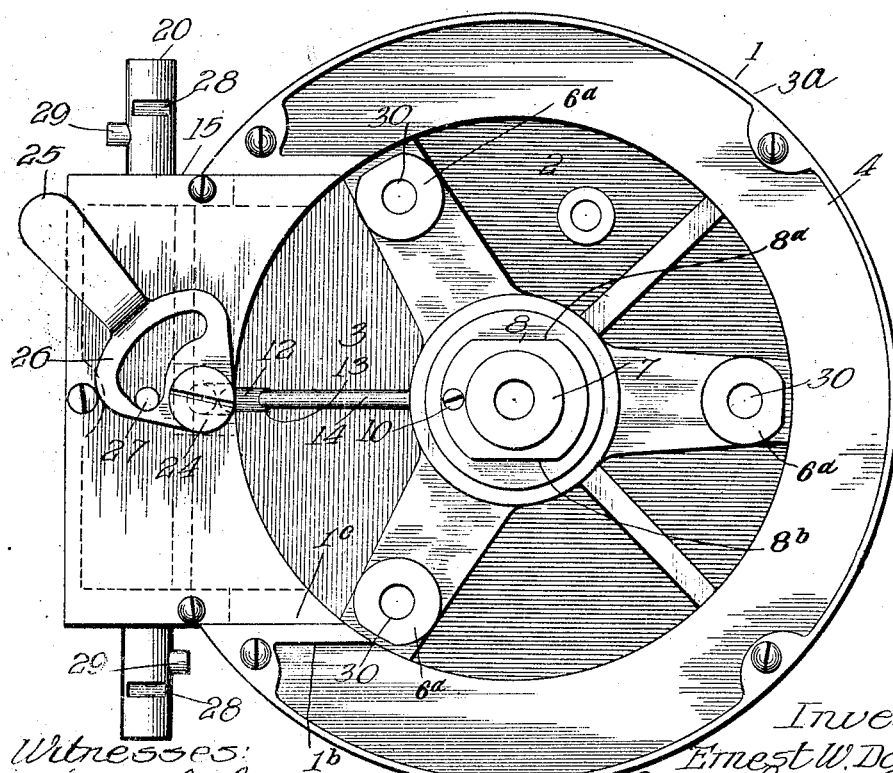

E. W. DAVIS.
TURNTABLE SUPPORT FOR CAMERAS.
APPLICATION FILED MAY 24, 1919.
1,378,999.
Patented May 24, 1921.
2 SHEETS—SHEET 2.
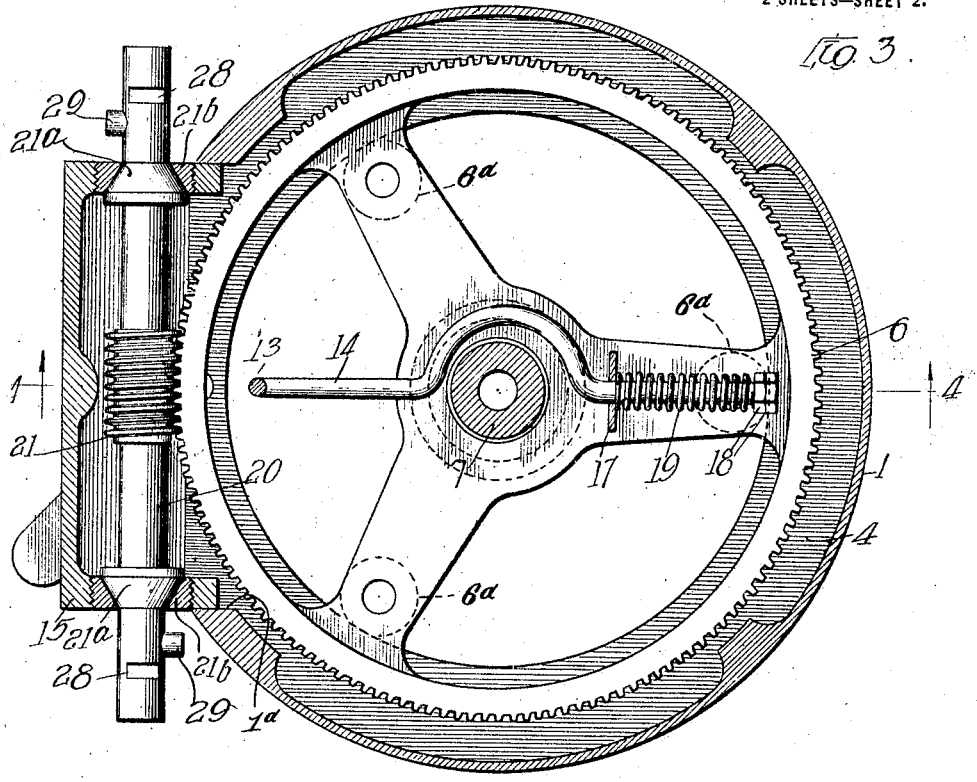
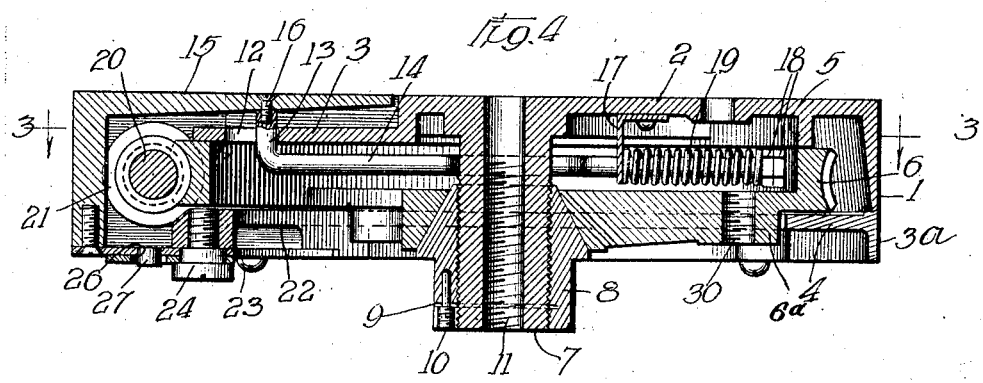
Witnesses:
Harry R. L. White
W. P. Kilroy
Inventor:
Ernest W. Davis
By Rudolph Wm. Lotz Attys

UNITED STATES PATENT OFFICE.

ERNEST W. DAVIS, OF CHICAGO, ILLINOIS, ASSIGNOR TO BURKE & JAMES, INC., OF CHICAGO, ILLINOIS, A CORPORATION OF DELAWARE.

TURNTABLE-SUPPORT FOR CAMERAS.

1,378,999.      Specification of Letters Patent.     Patented May 24, 1921.

Application filed May 24, 1919. Serial No. 299,529.

*To all whom it may concern:*

Be it known that I, ERNEST W. DAVIS, a citizen of the United States, residing at Chicago, in the county of Cook and State of Illinois, have invented certain new and useful Improvements in Turntable-Supports for Cameras; and I do hereby declare the following to be a full, clear, and exact description of the invention, such as will enable others skilled in the art to which it appertains to make and use the same.

This invention relates to improvements in rotatable tripod heads for photographic cameras and particularly motion picture cameras for rotating the same to follow a moving object or objects desired to be photographed or for making panoramic views. It is intended and adapted to be mounted upon a tripod of the character generally used in connection with motion picture machines or upon any other suitable supporting element.

The present invention has for its object to provide what may be termed a turn table for cameras, capable of being mechanically operated simultaneously with the camera mechanism to effect rotation of the camera body while photographing objects wherein all lost motion and vibration are prevented and the movements of which may be placed under such resistance or restraint as may be deemed necessary and desirable by the operator to enable him to most efficiently operate the same.

The invention consists in the features of construction and combinations of parts hereinafter fully described and particularly claimed.

In the accompanying drawings illustrating a suitable embodiment of the invention:

Figure 1 is a fragmentary view in side elevation of a tripod equipped with a turn table constructed in accordance with my invention.

Fig. 2 is a bottom plan view of a camera turn table mechanism.

Fig. 3 is a horizontal section of the turn table on the line 3—3 of Fig. 4.

Fig. 4 is a central vertical section on the line 4—4 of Fig. 3.

The said turn table comprises a cylindrical housing 1 which is closed at its top by an integral head 2 having an offset portion or flange 3 at one side disposed at a lower elevation, but extending parallel with the top surface of the head 2. The said housing 1 is composed of two parts removably coupled, the lower part thereof consisting of a ring 3ª provided with an internal annular flange 4 between which and the flange 3 and an arcuate flange 5 which terminates in or constitutes a continuation of the offset flange 3 a worm-wheel 6 is rotatable. Extending centrally downwardly from the head 2 is an externally threaded stem 7 upon which there is mounted a sleeve 8 presenting a conical support for the work wheel 6. Said sleeve 8 is provided with a transverse slot 9 spanned by a threaded element 10 by means of which said slot may be extended to cause the sleeve 8 to become rigidly engaged with the external threads of the stem 7. The latter is provided with a centrally threaded bore 11 by means of which it is suitably engaged with the center pin of a tripod or other support in a well known manner.

In the flange 3 there is provided a radial slot 12 through which the projection 13 of a rod 14 extends, said projection 13 being secured to the top plate of a reciprocable carriage or worm-box 15 by means of a screw 16. The body portion of the rod 14 is bent midway between its ends to extend around the stem 7 and at its other end passes through an opening in an L-shaped plate 17 secured to the top plate or head 2 of the casing 1. Said rod extends diametrically of the latter and is provided at the end opposite the projection 13 with removable nuts or collars 18 between which and the plate 17 a compression spring 19 is interposed. The carriage or worm-box 15 consists of a substantially rectangular box or casing entering a radial recess 1ª in one side of the casing 1. The side walls of said recess are provided with suitable guide formations 1ᵇ engaging coacting formations 1ᶜ on the carriage 15 for permitting the latter to move radially with respect to the casing 1, said guide formations being extended into the top plate or head 2 of said casing. They are of ordinary form and include means for taking up wear as is usual and are therefore not particularly illustrated constituting no part of the present invention. Mounted in bearings in the side walls of the carriage or worm-box 15 is a shaft 20 integral with a worm 21 which is adapted to mesh with the worm-wheel 6 when the said carriage 15 is disposed at the inner limit of its movement at which it is normally held by the spring 19 in an obvious manner. Contiguous to opposite ends of the shaft 20 and integral therewith are two annular flanges 21ª having opposed conical surfaces which are adapted to fit the tapered openings in adjustable bearings 21ᵇ threaded into the side walls of the worm-box 15 and by means of said bearings longitudinal movement of the shaft 20 is taken up, it being essential that there be no lost motion in the shaft or between the worm and worm-wheel. By forming the worm and the flanges 21ª integral with the shaft 20 concentricity of the latter with said parts and consequent smoothness of operation are assured. The worm and worm-wheel are also respectively cut to snugly and accurately mesh to prevent all possibility of lost motion so that rigidity of the camera at any point in its rotation may be assured. Integral with the ring 3ª or a flange 22 thereof, is a projection 23 having a threaded opening in which a set-screw or pin 24 engages. Pivotally mounted upon the latter is a rocking lever 25 having an arcuate slot 26 therein, one wall of which is eccentric to the said pin 24. The pin 27, rigid with the carriage or worm-box 15, engages in said slot 26 and is normally held by the spring 19 in contact with the eccentric wall of said slot, so that by rotating the said lever 25 in one direction, the pin will be caused to travel over the eccentric wall of the slot to move the worm-box 15 to the outer limit of its movement relatively to the casing 1 or vice versa will permit the same to be moved to the inner limit of its movement to cause the worm 21 to mesh with the worm wheel 6 under the influence of the spring 19. The shaft 20 is provided with suitable means, such as the recesses 28 and pin 29 for engaging a crank or other means for manually rotating the shaft 20 to effect rotation of the casing 1 with respect to its support and with respect to the worm-wheel 6. It will be noted that the sleeve 8 has two opposed flat sides 8ª and 8ᵇ and is adapted to have a wrench fitted thereto for adjusting it on the stem 7. The worm wheel is provided on each of its spokes with a boss 6ª each having a threaded opening 30 which is adapted to receive a set screw (not shown) on the supporting element for holding the worm wheel 6 against rotation with respect to the supporting element so that upon rotating the shaft 20, the casing 1 will be rotated while the worm wheel remains rigid.

When the worm 21 is thrown out of mesh with the worm-wheel 6, the casing 1 may be freely rotated about its axis but when the worm and worm-wheel are in mesh rotation of the casing 1 and the camera carried thereby must be effected by rotation of the shaft 20. This is manually effected by means of a removable crank-handle (not shown) which may be rotated by the operator with one hand while with the other he operates the camera mechanism. If the shaft 20 is not rotated, the camera body will be rigidly held against accidental rotation so long as the worm and worm-wheel are in mesh.

The spokes of the worm-wheel are relatively thin, flat and flexible so that by adjusting the sleeve 8 the rim of the wheel 6 will be caused to yieldingly bear against the lower edges or faces of the flanges 5 and 3 with that degree of pressure that the operator may deem desirable to resist free rotation of the housing about its axis to the end that the camera body may be quite firmly held in any position to which it is turned when the worm and worm-wheel are out of mesh, a free relative movement being disadvantageous. Thus these spokes act as springs to support a uniform frictional contact between the rim of the worm wheel and the arcuate flange 5.

While I have shown the preferred embodiment of the invention in the accompanying drawings, it will be understood, of course, that the same may be varied in details of construction to adapt it to the particular needs of the user without departing from the invention as defined in the appended claims.

I claim as my invention:

1. In a rotatable tripod head, a casing having a central stem, a worm-wheel housed therein having flexible spokes, an internal surface on the casing adapted to bear on the rim of the worm-wheel, and an adjustable element on said stem carrying said worm-wheel and adapted to force the same against the said surface of the casing against the spring of said spokes.

2. In a rotatable tripod head, a casing having a central stem, a worm-wheel housed by the casing and rotatable about said stem, an internal surface in said casing adapted to bear upon a surface of said worm-wheel for resisting free relative rotation of said parts and means for adjusting the position of the worm-wheel relatively to the casing for causing the contacting surfaces to be yieldably held in engagement with each other.

3. In a rotatable tripod head, a casing having a central threaded stem, a worm wheel housed by the casing and rotatable about said stem, an internal surface in said casing adapted to bear upon a surface of said worm-wheel for resisting free relative rotation of said parts, and means having threaded engagement with said stem and rotatably engaged with said worm-wheel for adjusting the position of the latter relatively to the casing to cause the contacting surfaces of the latter and the former to bear upon each other with a predetermined degree of pressure, there being flexible means associated with the worm-wheel, casing and adjustable element for producing yielding contact between the engaging surfaces of the casing and the worm-wheel 4. In a rotatable tripod head, a worm-wheel adapted to be rigidly mounted on a tripod, a casing for the same rotatable relatively thereto, a worm-box reciprocable radially of the casing, adjustable cone-bearings in the side walls of said worm-box, a shaft having integral opposed tapered collars engaged by said cone-bearings to hold the shaft against longitudinal movement relatively to the worm-box, a worm integral with said shaft between said collars adapted to be thrown into and out of mesh with said worm-wheel as said worm-box is reciprocated, and a spring associated with the worm-box and casing for holding the former at the inner limit of its movement to keep said worm in mesh with the worm-wheel.

ERNEST W. DAVIS.